No. 778,124. PATENTED DEC. 20, 1904.
W. M. FLEWELLING.
VEHICLE BRAKE.
APPLICATION FILED APR. 30, 1904.
NO MODEL.
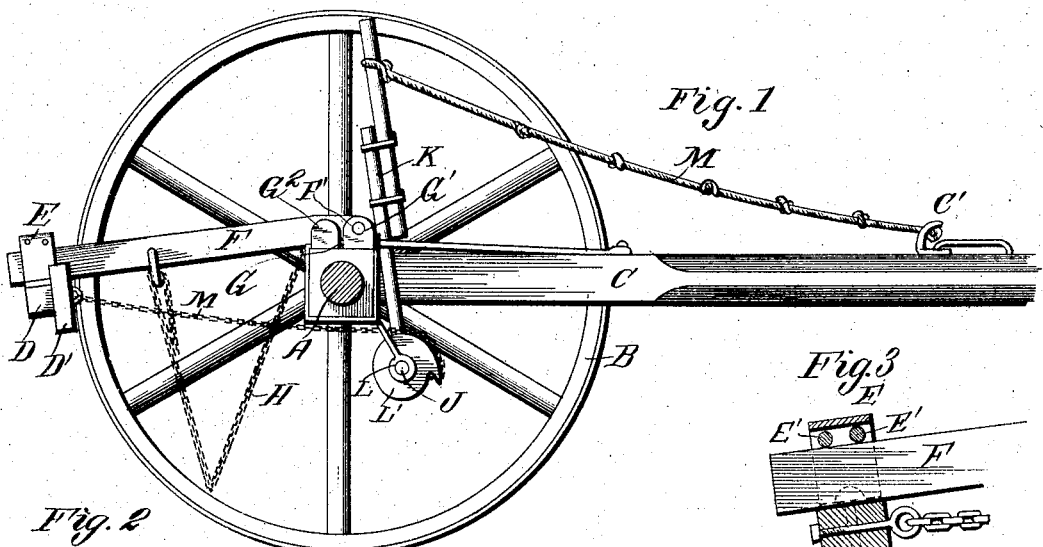
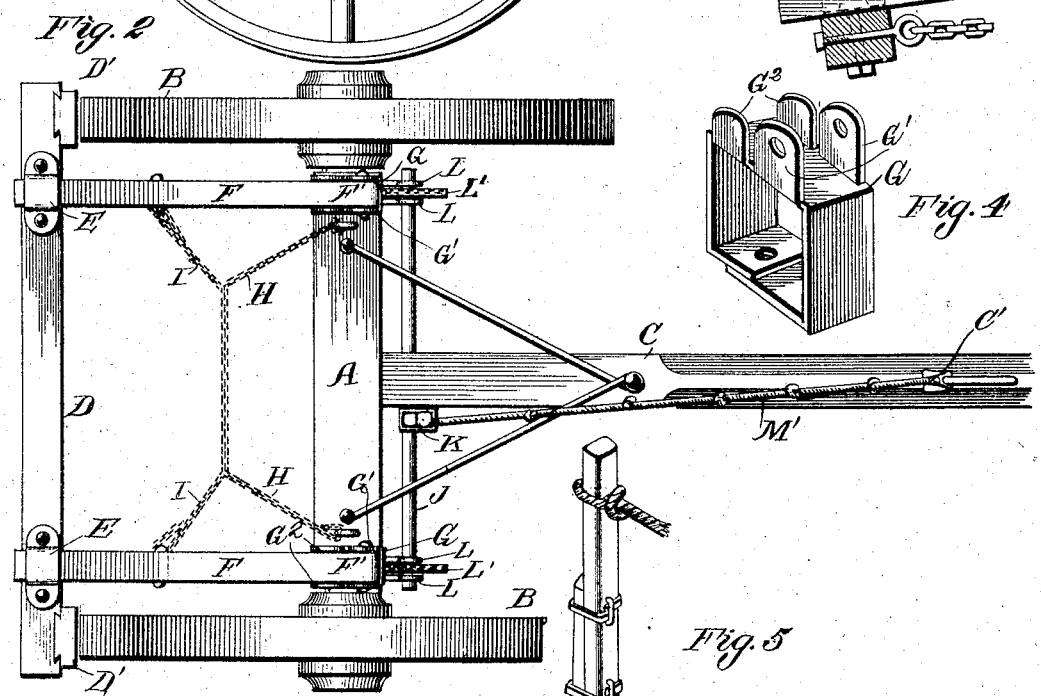
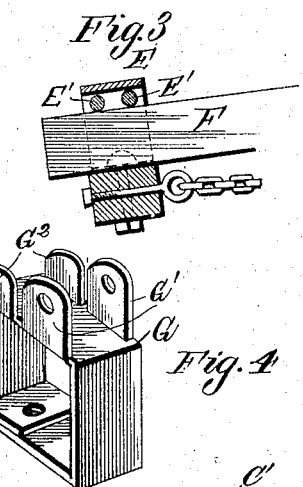
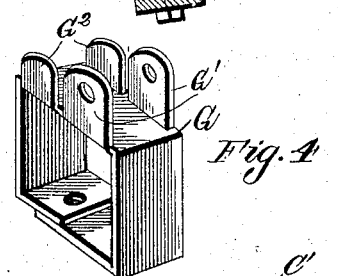
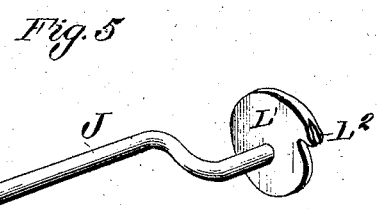
WITNESSES: 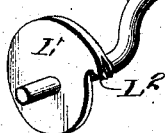
Edward Duffey
Perry B. Turpin
INVENTOR
Willard M. Flewelling
BY Munn & Co.
ATTORNEYS No. 778,124.    Patented December 20, 1904.

UNITED STATES PATENT OFFICE.

WILLARD MORTIMER FLEWELLING, OF SANTA ROSA, CALIFORNIA.

VEHICLE-BRAKE.

SPECIFICATION forming part of Letters Patent No. 778,124, dated December 20, 1904.

Application filed April 30, 1904. Serial No. 205,745.

*To all whom it may concern:*

Be it known that I, WILLARD MORTIMER FLEWELLING, a citizen of the United States, and a resident of Santa Rosa, in the county of Sonoma and State of California, have made certain new and useful Improvements in Vehicle-Brakes, of which the following is a specification.

My invention is an improvement in brakes for logging-trucks, and particularly for that class of logging-trucks in which the logs are suspended from the truck; and the invention consists in certain novel constructions and combinations of parts, as will be hereinafter described and claimed.

In the drawings, Figure 1 is a side elevation of a truck embodying my invention. Fig. 2 is a top plan view of the truck. Fig. 3 is a detail view illustrating the connection between the brake-beam and one of the beam-carrying bars. Fig. 4 is a detail perspective view illustrating the boxing for securing the pivoted connection between the beam-carrying bars and the axle of the truck, and Fig. 5 is a detail perspective view of the lever with its take-up or winding disks for setting the brake.

The truck has an axle A, the wheels B at the ends thereof, and the pole or tongue C, the latter being provided near its front end with a catch C' for engagement by the knotted cord M, which may be utilized in operating the lever to set the brake.

The brake-beam D has the shoes D' to engage the wheel and is provided on its upper side with the loops E, having rollers E' and sliding along the beam-carrying bars F, which latter are pivoted at their forward upper ends at F' in connection with the axle, so the lower rear ends of the bars F may rise and fall as may be necessary. In securing the pivotal connection at F' of the bars with the axle I prefer to employ the boxes G, embracing the axle and provided at their upper sides with the lugs G', between which the bars F are pivoted at F', and with the keeper projections G² in rear of the lugs G' and aiding in steadying the bars F in position.

The logging-chain H connects at its ends with the axle A near the ends of the latter, and stay-chains I' connect at their upper ends with the beam-carrying bars F between the ends of the latter and extend down and connect with the logging-chain H, so the weight of the log is carried from the axle and also exerts a downward tendency on the beam-carrying bars F, as will be understood from the drawings.

A shaft J, having a lever K, is journaled in supports L, depending from the axle at the front side of the latter. This shaft is arranged to press the brake-beam to braked position, being preferably provided with winding devices, which may be in the form of take-up or winding disks L', having hooks L² to facilitate the connection of chains M, which extend between said disks and the brake-beam so the brake-beam can be pulled against the wheels by the operation of the lever, which latter may be provided with a knotted rope M, extending forward so it can be drawn upon by the operator and held by the engagement of its knots with the catch at the front end of the tongue or pole.

My invention is especially designed for use in logging-trucks in which the logs are suspended from the trucks, and it will be noticed that the weight of the log operates to hold the beam-carrying bars down in position for the proper operation of the brake when set by means of the devices before described.

Having thus described my invention, what I claim as new, and desire to secure by Letters Patent, is—

1. The improvement in logging-trucks herein described comprising the axle, the wheels thereon, the forwardly-projecting pole or tongue having a catch near its front end, the brake-setting lever having its shaft provided with take-up or winding disks, the knotted connection secured to the lever and arranged to engage with the catch on the pole, the brake-beam provided with loops, the beam-supporting bars operating in said loops and pivoted at their upper front ends in connection with the axle, the logging-chain connected with the axle, the stay-chains connecting the logging-chain with the beam-carrying bars, and the chains connecting the beam with the take-up or winding disks on the lever-shaft substantially as and for the purposes set forth.

2. The combination of the axle, the brake-beam, the beam-carrying bars pivotally connected with the axle, the logging-chain secured to the axle, the stay-chains between the logging-chain and the beam-carrying bars and means for operating the brake-beam.

3. The combination of the axle, the beam-carrying bars pivotally connected with the axle, the brake-beam having loops slidable along the said bars, operating means connected with the beam, the logging-chain connected with the axle, and the stay-chains connecting said logging-chain with the beam-carrying bars.

4. The combination of the axle, the beam-carrying bars, the boxes fitting on the axle and having at their upper sides lugs to which the said bars are pivoted and guiding-lugs in rear of said pivot-lugs, the brake-beam slidable along the beam-carrying bars and means for operating said brake-beam substantially as set forth.

5. The combination substantially as herein described of the axle, the forwardly-projecting pole or tongue having a catch near its front end, the brake-beam, the brake-setting lever having its shaft provided with take-up disks, the knotted connection secured to the lever and engaging with the catch on the pole, the brake-beam and connections between the brake-beam and the take-up disks on the shaft of the brake-setting lever substantially as set forth.

WILLARD MORTIMER FLEWELLING.

Witnesses:
   GERHARD NELSEN,
   H. W. R. WESKE.